United States Patent [19]

Semple et al.

[11] Patent Number: 5,080,418

[45] Date of Patent: Jan. 14, 1992

[54] PICKUP TRUCK STABILIZING INSERT

[76] Inventors: William J. Semple, 328 4th Ave., Box 138, Matheson, Ontario, Canada, P0K 1N0; Luc P. Legault, Box 107, Oroqois Falls, Ontario, Canada, P0K 1E0

[21] Appl. No.: 668,064

[22] Filed: Mar. 12, 1991

[51] Int. Cl.$^5$ .............................................. B62D 25/00
[52] U.S. Cl. .................................. 296/39.2; 220/88.1; 280/757
[58] Field of Search .................... 296/39.1, 39.2; 122/503; 220/905, 563, 88.1; 280/757, 759, 831

[56] References Cited

U.S. PATENT DOCUMENTS

| | | | |
|---|---|---|---|
| 3,349,953 | 10/1967 | Conaway et al. | 220/88.1 X |
| 4,333,678 | 6/1982 | Munoz et al. | 296/39.2 |
| 4,613,054 | 9/1986 | Schrenk | 220/88.1 |
| 4,796,914 | 1/1989 | Raynor | 296/39.2 X |
| 4,893,862 | 1/1990 | Hollenbaugh, Sr. | 296/39.1 |

Primary Examiner—Margaret A. Focarino
Assistant Examiner—Joseph D. Pape
Attorney, Agent, or Firm—Leon Gilden

[57] ABSTRACT

An insert arranged for complementarily mounting within a pickup truck bed, wherein the insert includes planar wall construction, with a ribbed top wall to enhance strength and traction of the top wall. The organization defines a central cavity coextensively directed throughout the insert, with a fill plug directed to the top wall and a drain plug directed through and removably mounted relative to the rear wall to permit fluid filling of the cavity to provide weight and enhanced stabilizing of the pickup bed during use of the pickup in reduced traction situations, such as in rain, snow, and the like. A modified form of the invention includes apertured spherical shells contained coextensively throughout the cavity to provide fluid baffling and minimize sloshing of water within the pickup bed.

4 Claims, 4 Drawing Sheets

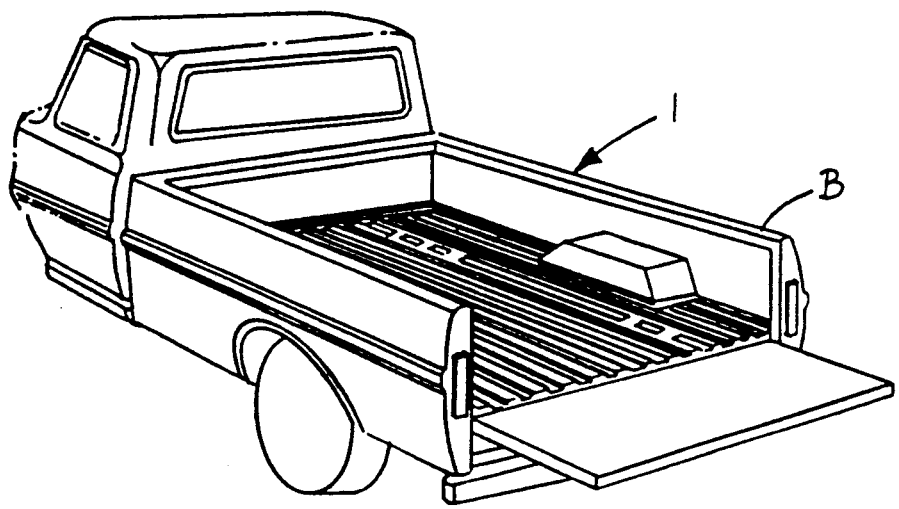
PRIOR ART
FIG. 2
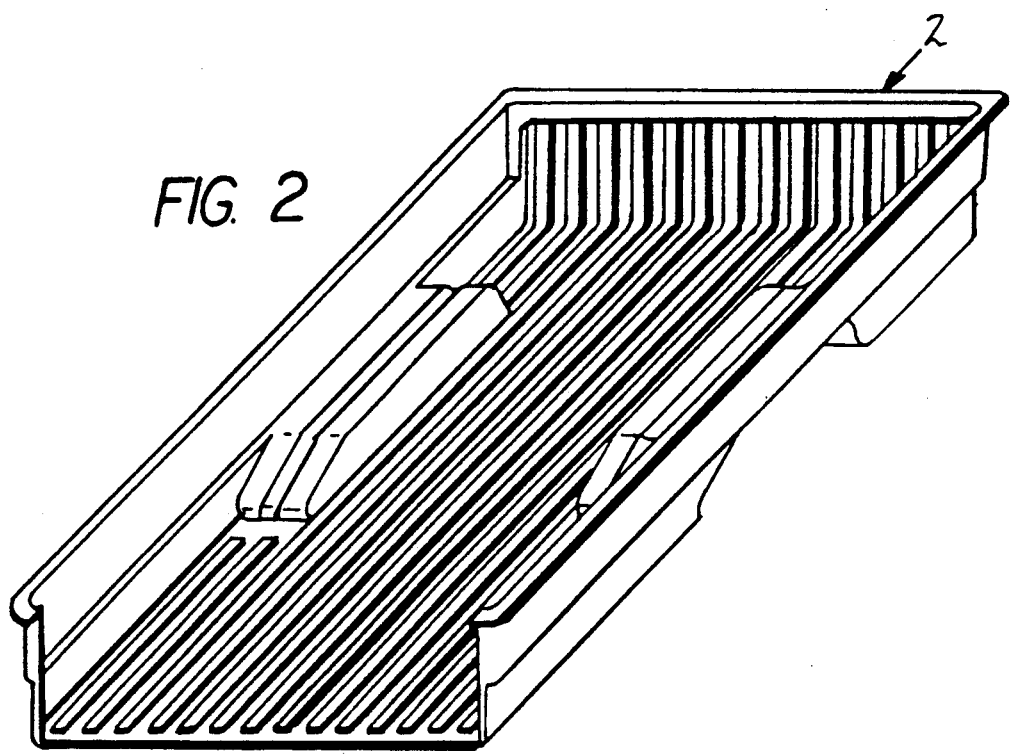
PRIOR ART

PICKUP TRUCK STABILIZING INSERT

BACKGROUND OF THE INVENTION

1. Field of the Invention

The field of invention relates to pickup truck bed inserts, and more particularly pertains to a new and improved pickup truck stabilizing insert wherein the same provides selective weight addition distributed uniformly overlying the pickup bed to provide enhanced stabilizing of the pickup during use.

2. Description of the Prior Art

Various pickup bed inserts have been utilized in the prior art to primarily provide protection to an interior surface of a pickup bed. Such structure may be found in U.S. Pat. No. 4,162,098 to Richardson wherein a liner utilizing a ribbed surface is mounted coextensively overlying a pickup bed floor.

U.S. Pat. No. 4,767,149 to Rye sets forth a pickup bed liner utilizing side walls for enhanced protection of the pickup bed.

U.S. Pat. No. 4,279,439 to Cantieri sets forth a further example of a liner for the pickup bed utilizing a flapper overlying the tail gate interior surface.

U.S. Pat. No. 4,693,507 to Dresen, et al. and U.S. Pat. No. 4,890,874 to Davis are further examples of liners for coextensively lining an interior surface of the pickup bed.

In contrast, the application attempts to overcome deficiencies of the prior art by providing a protective liner, wherein the liner includes a cavity coextensive with the pickup bed floor, with the liner arranged for receiving fluid for imparting stability and traction to the pickup bed during use and as such, the present invention substantially fulfills this need.

SUMMARY OF THE INVENTION

In view of the foregoing disadvantages inherent in the known types of pickup bed liner apparatus now present in the prior art, the present invention provides a pickup truck stabilizing insert wherein the same is arranged to accommodate fluid for imparting stability and enhanced traction to the pickup during use. As such, the general purpose of the present invention, which will be described subsequently in greater detail, is to provide a new and improved pickup truck stabilizing insert which has all the advantages of the prior art pickup truck insert apparatus and none of the disadvantages.

To attain this, the present invention provides an insert arranged for complementarily mounting within a pickup truck bed, wherein the insert includes a planar wall construction, with a ribbed top Wall to enhance strength and traction of the top wall. The organization defines a central cavity coextensively directed throughout the insert, with a fill plug directed to the top wall and a drain plug directed through and removably mounted relative to the rear wall to permit fluid filling of the cavity to provide weight and enhanced stabilizing of the pickup bed during use of the pickup in reduced traction situations, such as in rain, snow, and the like. A modified form of the invention includess apertured spherical shells contained coextensively throughout the cavity to provide fluid baffling and minimize sloshing of water within the pickup bed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pickup truck stabilizing insert which has all the advantages of the prior art pickup truck liner apparatus and none of the disadvantages.

It is another object of the present invention to provide a new and improved pickup truck stabilizing insert which may be easily and efficiently manufactured and marketed.

It is a further object of the present invention to provide a new and improved pickup truck stabilizing insert which is of a durable and reliable construction.

An even further object of the present invention is to provide a new and improved pickup truck stabilizing insert which is susceptible of a low cost of manufacture with regard to both materials and labor, and which accordingly is then susceptible of low prices of sale to the consuming public, thereby making such pickup truck stabilizing inserts economically available to the buying public.

Still yet another object of the present invention is to provide a new and improved pickup truck stabilizing insert which provides in the apparatuses and methods of the prior art some of the advantages thereof, while simultaneously overcoming some of the disadvantages normally associated therewith.

Still another object of the present invention is to provide a new and improved pickup truck stabilizing insert wherein the same is arranged to accommodate fluid selectively therewithin to provide enhanced traction to the pickup truck during use thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art pickup truck liner insert.

FIG. 2 is an isometric illustration of a further example of a pickup truck liner utilized in the prior art.

DESCRIPTION OF THE PREFERRED EMBODIMENT

Figure 3:
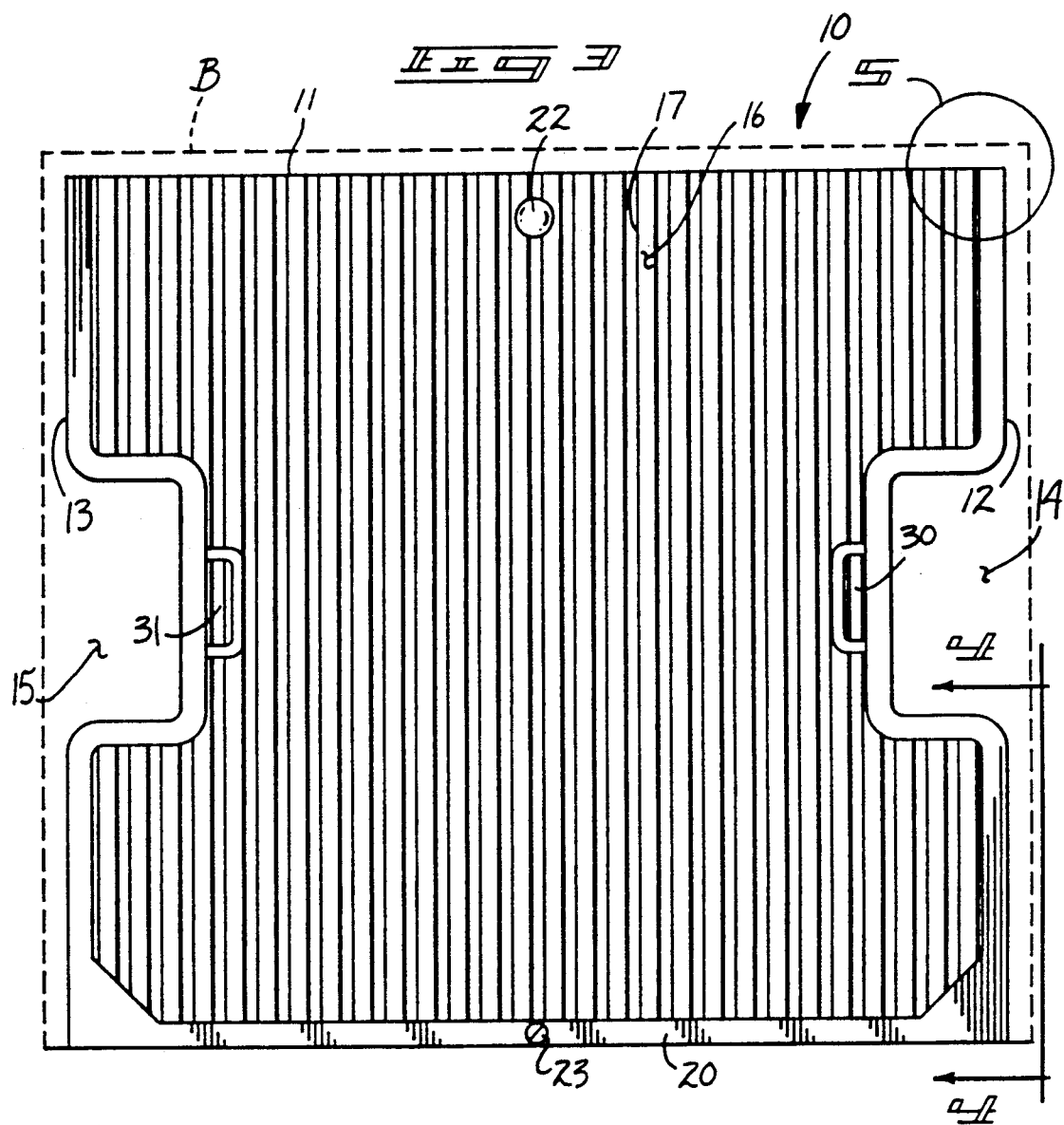
FIG. 3 is an orthographic top view of the instant invention.
Figure 4:
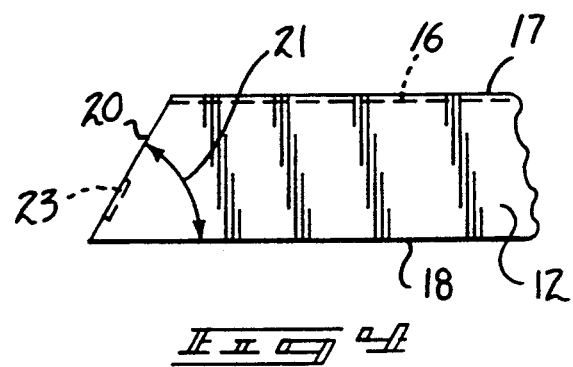
FIG. 4 is an orthographic view, taken along the lines 4—4 of FIG. 3 in the direction indicated by the arrows.
Figure 5:
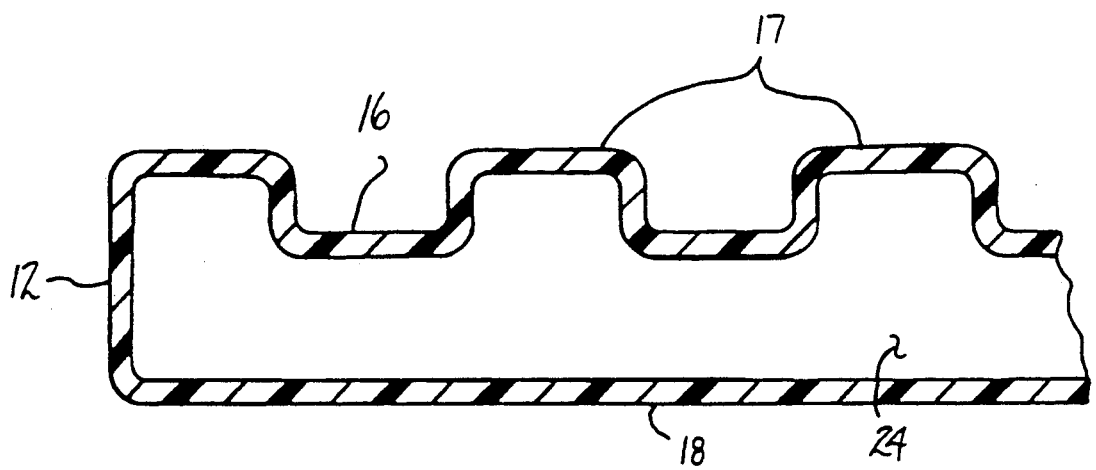
FIG. 5 is an orthographic cross-sectional view of FIG. 4 as set forth in FIG. 3.
Figure 6:
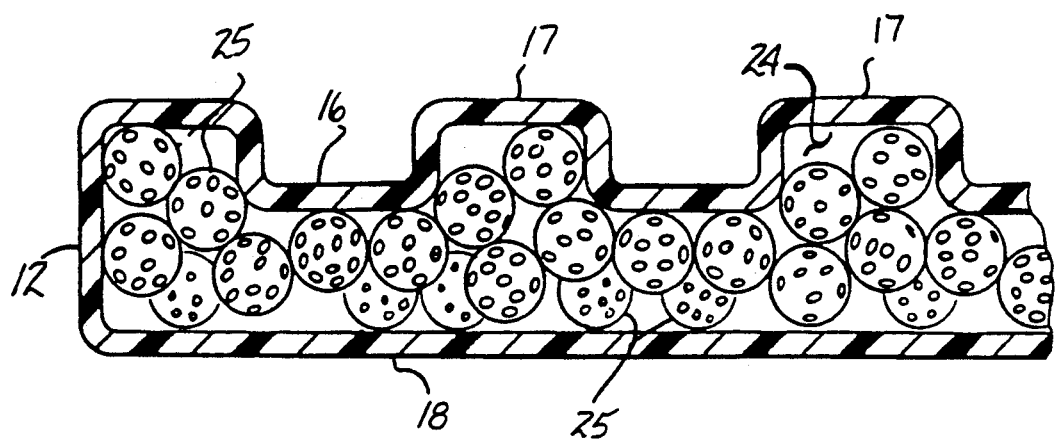
FIG. 6 is an orthographic cross-sectional view of a modified insert cavity utilized by the instant invention.

With reference now to the drawings, and in particular to FIGS. 1 to 8 thereof, a new and improved pickup truck stabilizing insert embodying the principles and concepts of the present invention and generally designated by the reference numeral 10 will be described.

FIG. 1 illustrates a prior art pickup truck insert 1, wherein the insert utilizes a flexible liner mounted coextensively of the pickup truck bed floor, as set forth in U.S. Pat. No. 4,162,098. Similarly, the pickup truck liner insert 2, as set forth in FIG. 2, and as described in U.S. Pat. No. 4,767,149, utilizes side walls for enhanced protection of an interior surface of a pickup truck bed portion "B", as illustrated in FIG. 1.

More specifically, the pickup truck stabilizing insert 10 of the instant invention essentially comprises a hollow insert defined by a planar forward wall 11, a planar right side wall 12, a planar left side wall 13, with the planar right and left side walls 12 and 13 respectively including a right and left side wall notch 14 and 15 respectively directed into each side wall to accommodate an associated wheel well of the pickup truck bed "B", in a manner as illustrated in FIG. 1 for example. The right side wall notches 14 and 15 respectively define recesses within the respective right and left side walls, with a right handle cavity 30 and a left handle cavity 31 respectively positioned to the top wall adjacent the respective right and left notches. The right and left handle cavities directed to the top wall adjacent the side walls permit manual grasping of the insert for selective removal and replacement of the insert relative to the floor of the pickup truck bed. A planar top wall 16 overlies and is parallel to a planar bottom wall 18. The planar top wall 18 includes coextensively about its surface spaced parallel ribs 17 to provide enhanced fluid flow and drainage, as well as enhanced strength to the planar top wall 16. A planar rear wall 20 is arranged to define an acute included angle 21 between the bottom wall 18 and the rear wall 20. The sloping orientation of the rear wall 20 provides enhanced ease of directing of various cargo and components onto the top wall 16. A removable fill plug 22 is mounted removably through the top wall 16 adjacent the forward wall 11, while a drain plug 23 is removably directed through the planar rear wall 20 adjacent the bottom wall 18. The fill and drain plugs 22 and 23 respectively permit selective filling and drainage of fluid, such as water, directed within the insert cavity 24 that is coextensively directed throughout the insert between the wall structure thereof. The fluid provides enhanced traction and weight for the drive rear wheels of a conventional pickup of a type that is illustrated in FIG. 1 for example, and evenly distributes its weight throughout the floor of the pickup bed between the side walls thereof, in a manner as illustrated in by the pickup bed "B" as illustrated in phantom in FIG. 3.

The cavity 24 in a modified embodiment of the invention includes apertured spherical shells 25 coextensively filling the cavity 24, wherein the apertured shells provide enhanced strength and cargo carrying stability to the insert, as well as providing fluid baffling when reduced fluid levels are utilized with the insert to minimize agitation and sloshing of the fluid therewithin for uniform weight distribution of the fluid during periods of acceleration, deceleration, cornering, and the like in use of the pickup truck.

Figure 7:
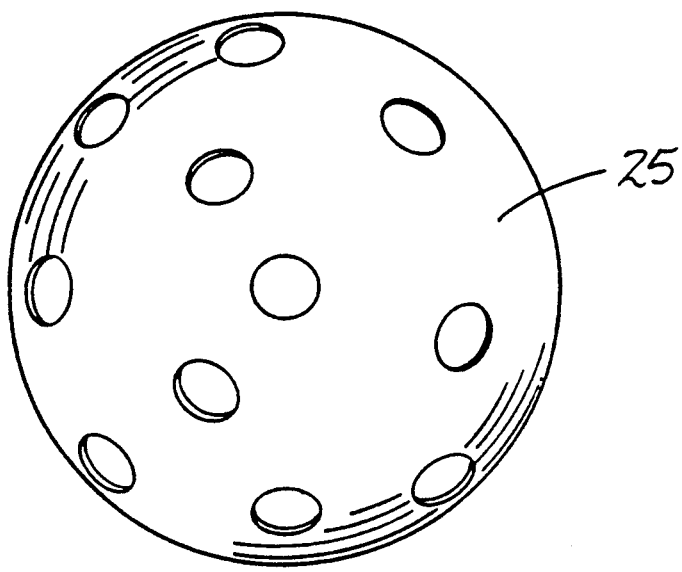
FIG. 7 is an isometric illustration of an apertured spherical shell utilized by the instant invention within the cavity, as illustrated in FIG. 6.
Figure 8:
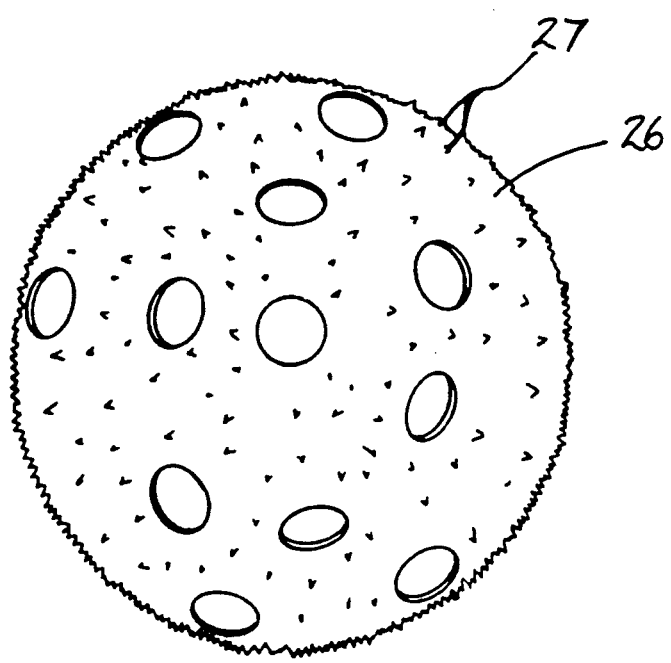
FIG. 8 is an isometric illustration of a modified apertured spherical shell construction.

A shell structure 25, as illustrated in FIG. 7 illustrating the apertured shell, wherein the aperture provides access to the central cavity of the shell as illustrated. FIG. 8 illustrates a modified apertured spherical shell 26, wherein the modified spherical shell 26 includes protrusions coextensively with an exterior surface of the shell 26 for enhanced baffling of fluid exteriorly of the shell, as well as interiorly thereof in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pickup truck stabilizing insert arranged for positioning within a pickup bed, wherein the pickup bed includes a pickup bed floor, and the insert includes a planar bottom wall coextensive with the floor, the insert further including a right side wall spaced from and parallel to a left side wall, and a planar forward wall spaced forwardly of a planar rear wall, and a planar top wall spaced above and coextensively overlying the planar bottom wall, and the insert defining a cavity coextensively directed between the top wall and the bottom wall, and the top wall including a removable fill plug, and the rear wall including a removable drain plug directed through the rear wall adjacent the bottom wall, with the fill plug and drain in communication with the cavity permitting selective filling and drainage of fluid from the cavity, and wherein the right side wall includes a right side wall notch defining a recess within the right side wall, and the left side wall including a left side wall notch aligned with the right side wall notch defining a further recess, and a right handle cavity positioned through the top wall adjacent the right side wall notch, and a left handle cavity directed through the top wall adjacent the left side wall notch to permit manual grasping of the insert for selective removal and replacement of the insert relative to the floor.

2. An apparatus as set forth in claim 1 wherein the rear wall is inclined relative to the bottom wall to permit ease of directing of cargo onto the top wall over the rear wall.

3. An apparatus as set forth in claim 2 wherein the cavity contains a plurality of apertured spherical shells positioned and captured within the cavity to provide baffling of fluid contained within the cavity and enhanced strength to the insert to accommodate cargo positioned upon the top wall.

4. An apparatus as set forth in claim 3 wherein each spherical shell includes a matrix of protrusions formed about each exterior surface of each shell to provide enhanced baffling of fluid exteriorly of each shell within the cavity.

* * * * *